United States Patent [19]

Armstrong

[11] 4,156,269
[45] May 22, 1979

[54] MULTILAMP PHOTOFLASH UNIT

[75] Inventor: Donald E. Armstrong, Williamsport, Pa.

[73] Assignee: GTE Sylvania Incorporated, Stamford, Conn.

[21] Appl. No.: 840,498

[22] Filed: Oct. 7, 1977

[51] Int. Cl.$^2$ ............................................. G03B 15/02
[52] U.S. Cl. .......................................... 362/13; 362/5
[58] Field of Search .................. 362/3, 11, 13, 14, 15, 362/5, 16, 10, 140, 184, 227, 800, 4

[56] References Cited

U.S. PATENT DOCUMENTS

| | | | |
|---|---|---|---|
| 3,614,412 | 10/1971 | Bellows | 362/13 |
| 4,053,757 | 10/1977 | Blount | 362/4 |
| 4,059,387 | 11/1977 | Witterick et al. | 362/11 X |

Primary Examiner—William M. Shoop
Assistant Examiner—Peter S. Wong
Attorney, Agent, or Firm—Edward J. Coleman

[57] ABSTRACT

A photoflash unit comprising two parallel columns of horizontally disposed lamps mounted in a planar array with flash indicators aligned behind each lamp. The lamps of one column are staggered with respect to the other, and the two columns are located on opposite sides of the vertical centerline of the unit. The lamps are connected to switching circuitry for sequentially flashing the lamps in response to firing pulses applied to a connector at one end of the unit. The two columns of staggered lamps are positioned so that the lowest lamp is located on the side of the unit centerline opposite that on which the lens axis is located when the unit is connected to a camera, thereby farther removing the closest lamp from the lens axis to minimize the "red-eye" effect. The switching circuitry is connected to provide an order of flashing that proceeds alternately between the two columns from the lowest to the highest lamp of the array, thereby providing a more readily interpretable flash indicator pattern.

9 Claims, 4 Drawing Figures

MULTILAMP PHOTOFLASH UNIT

BACKGROUND OF THE INVENTION

The present invention relates to multilamp photoflash units and, more particularly, to the improved arrangement and control of photoflash lamps in a planar array.

Numerous multilamp arrangements with various types of sequencing circuits have been described in the prior art; particularly in the past few years. A currently marketed photoflash unit (described in U.S. Pat. Nos. 3,894,226; 3,912,442; 3,935,442; 3,937,946; 3,941,992; 3,952,320 and 4,017,728 and referred to as a flip flash) employs highvoltage type lamps adapted to be ignited sequentially by successively and applied high-voltage firing pulses from a source such as a camera-shutter-actuated piezoelectric element. The flip flash unit comprises an elongated planar array of eight high-voltage type flashlamps mounted on a printed circuit board with an array of respectively associated reflectors disposed therebetween. The lamps are arranged in two groups of four disposed on the upper and lower halves respectively of the rectangular-shaped circuit board. A set of terminal contacts at the lower end of the unit is provided for activation of the upper group of lamps, while a set of terminal contacts at the top of the unit is operatively associated with the lower group of four lamps. The application of successive high-voltage pulses (e.g., 500 to 4,000 volts from, say, piezoelectric source controlled by the shutter of a camera in which the array is inserted) to the terminal contacts at the lower end of the unit causes the four lamps at the upper half of the array to be sequentially ignited. The array may then be turned end for end and again inserted into the camera in order to flash the remaining four lamps. In this manner, one group of lamps (or half of the array) functions as a flash extender for the other group of lamps, so that only the group of lamps relatively farther from the camera lens axis can be flashed. The purpose of such an arrangement is to position the "active" group of flashlamps farther above the camera lens in order to reduce the possibility of a "red-eye" effect that causes the pupils of a person's eyes to appear red or pink in flash pictures taken when the flashlamp is close to the camera lens.

The flip flash circuit board comprises an insulating sheet of plastic having a pattern of conductive circuit traces, including the terminal contacts, on one side. The flashlamp leads are electrically connected to these circuit traces by means of eyelets secured to the circuit board and crimped to the lead wires. The circuitry on the board includes six printed, normally open, connect switches that chemically change from a high to lower resistance so as to become electrically conducting after exposure to the radiant heat energy from an ignited flashlamp operatively associated therewith. The purpose of these switches is to provide lamp sequencing and one-at-a-time flashing. The four lamps of each group are arranged in a parallel circuit with three of the four lamps being connected in series with their respective thermal connect switches. Initially, only the first of the group of four lamps is connected directly to the voltage pulse source. When this first group flashes, it causes its associated thermal connect switch (which is series connected with the next or second lamp) to become permanently conductive. Because of this action, the second lamp of the group of four is connected to the pulse source. This sequence of events is repeated until all four lamps have been flashed.

The overall construction of the flip flash unit comprises front and back plastic housing members with interlocking means for providing a unitary structure. The front housing member is a rectangular concavity and the back housing is substantially flat. Sandwiched between the front and back housing members, in the order named, are the flashlamps, a unitary member, preferably of aluminum-coated plastic, shaped to provide the eight individual reflectors of the array, an insulating sheet, a printed circuit board, and an indicia sheet, which is provided with information, trademarks, and flash indicators located behind the respective lamps and which change color due to heat and or light radiation from a flashing lamp, thus indicating at a glance which of the lamps have been flashed and not flashed.

A copending application Ser. No. 840,497, filed concurrently herewith and assigned to the present assignee, describes an improved multilamp photoflash unit which more efficiently utilizes a given housing volume and thereby reduces the cost of the unit per flashlamp contained therein. More specifically, a compact lamp arrangement is provided whereby additional lamps are contained in a given volume while maintaining light output performance requirements. In a particular embodiment described, ten lamps are provided in a housing having the same dimensions as the above-discussed eight-lamp flip flash units. This greater compactness is provided by arranging the planar array of lamps in two parallel columns with the tubular envelopes horizontally disposed and with the lamps of one column staggered with respect to the other such that the bases are interdigitated. A pair of reflector panels are aligned with the two columns of lamps and arranged to overlie the lamp lead-in wires and bases.

The present invention is concerned with providing the most effective choice of lamp position and firing order for a photoflash unit of this last-mentioned staggered-column type.

SUMMARY OF THE INVENTION

Accordingly, it is an object of the present invention to provide an improved multilamp photoflash unit which more efficiently utilizes a given housing volume while reducing red-eye effect and clearly indicating the number of lamps remaining to be flashed.

One principal object of the invention is to maximize red-eye protection in a staggered-column array of lamps.

Another object is to provide a flashed lamp indicator pattern which avoids confusion and more clearly alerts a user when all the lamps in a sequence have been flashed.

A further object of the invention is to reduce the red-eye effect in a two-column planar array of lamps.

These and other objects, advantages, and features are attained in a photoflash unit of elongated shape including means at one end thereof for operatively connecting the unit to a camera having a lens axis offset to one side of the vertical centerline of the unit. A planar array of photoflash lamps in the unit is arranged in two columns disposed on opposite sides of the unit centerline. In a preferred embodiment, the lamps of one column are staggered relative to the lamps of the other column. In accordance with one aspect of the invention, the two columns of staggered lamps are positioned with the lowest lamp located on the side of the unit centerline opposite the side on which the lens axis is located when the unit is connected to a camera.

In a preferred embodiment, the unit includes switching circuitry for sequentially flashing the lamps in response to firing pulses applied to the connecting means. In addition, the unit has a plurality of flash indicator means located on the back of the planar array and respectively aligned behind each of the lamps, each indicator means being actuated by its associated lamp. According to another aspect of the invention, the switching circuitry is connected to provide an order of flashing of the lamps which proceeds alternately between the two columns from the lowest lamp to the highest lamp of the array.

Accordingly, in the photoflash unit of the invention, the lamp of the active array which is closest to the camera, which is also the first lamp to be flashed, is farther removed from the lens axis when the unit is attached to a camera. Further, the flash indicating pattern will proceed in a zig-zag fashion toward the top of the unit. There is no misleading or confusing pattern, such as proceeding up one column and then down the other. When the top indicator is actuated, the user is clearly alerted that the unit should be repositioned or disposed of. In summary, the lamps and circuitry of the compact array are located to significantly reduce the possibility of both the "red-eye" problem and the problem of overlooking the last flash.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
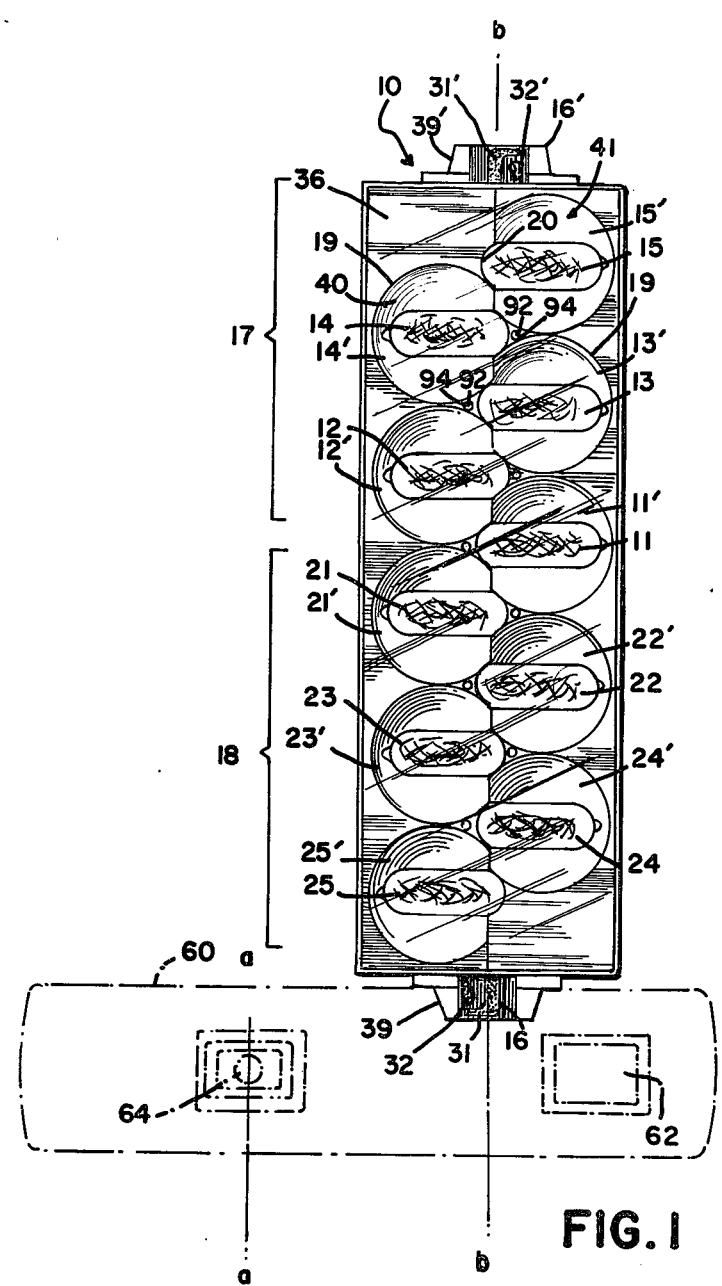
FIG. 1 is a front elevation of a multilamp photoflash unit in accordance with the invention, with the camera on which it is mounted shown in phantom.
Figure 3:
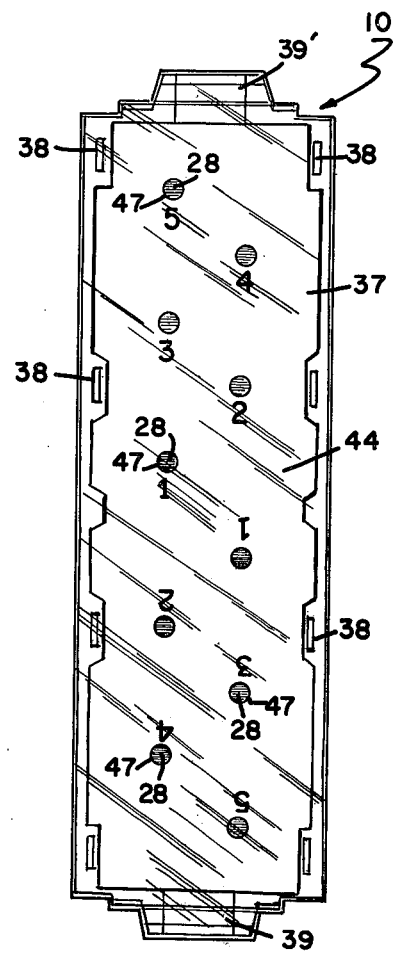
FIG. 3 is a rear elevation of the unit of FIG. 1 showing the indicia sheet with flash indicators.
Figure 2:
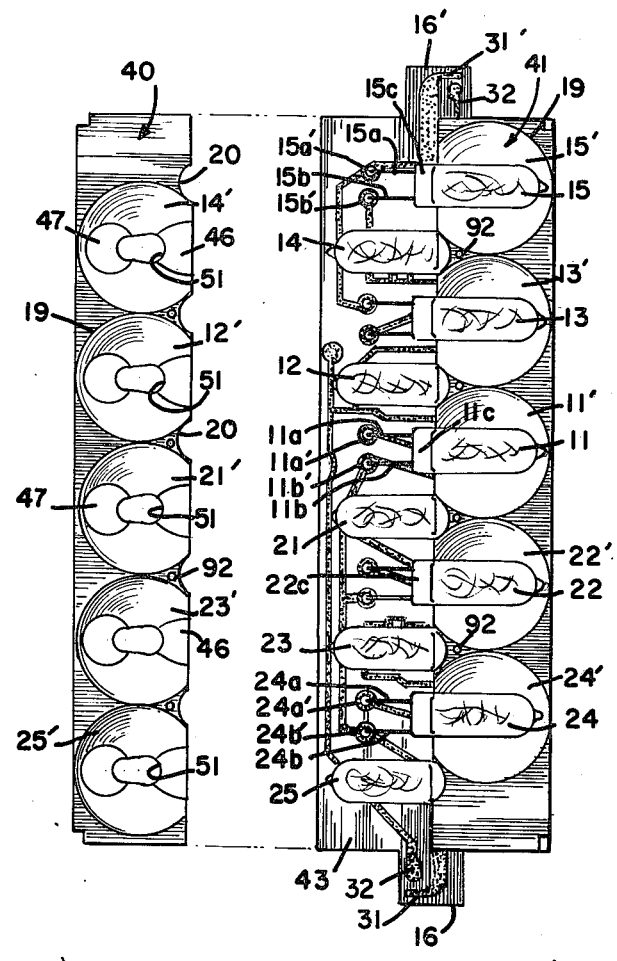
FIG. 2 is a front elevation of the unit of FIG. 1 with the cover removed and one of the reflector panels separated and spaced to the side.

FIGS. 1-3 illustrate a multilamp photoflash unit of the type described in the aforementioned copending application Ser. No. 840,497. This unit is similar in general operation to that described in the aforementioned U.S. Pat. No. 4,017,728, except that the construction has been modified, in accordance with the invention, to provide an effective arrangement and firing order for additional lamps in a housing having the same outer dimensions. The prior art flip flash unit described in U.S. Pat. No. 4,017,728 comprised a planar array of eight tubular-shaped, high voltage type flashlamps (two groups of four) with associated reflector cavities provided in a single reflector member. The eight tubular lamps were vertically disposed and arranged in a pair of aligned parallel columns of four lamps each. The firing order of the upper four lamps (as viewed from the front of the array) proceeded from lower left to lower right, then to upper right, and finally to upper left.

The unit of FIGS. 1-3, on the other hand, comprises a planar array of ten flashlamps 11-15 and 21-25 mounted on a printed circuit board 43, with an array of respectively associated reflector cavities 11'-15' and 21'-25' disposed therebetween. As will be described in detail, the lamps are horizontally disposed and mounted in two parallel columns, with the lamps of one column staggered with respect to the lamps of the other. The reflector cavities are provided on a pair of strip-like panels 40 and 41 which are conveniently separable for assembly purposes. The array is provided with a plug-in connector tab 16 at the lower end thereof which is adapted to fit into a camera or flash adapter. A second plug-in connector tab 16' is provided at the top end of the unit, whereby the array is adapted to be attached to the camera socket in either of two orientations, i.e., with either the tab 16 or the tab 16' plugged into the socket. The lamps are arranged in two groups of five disposed on the upper and lower halves respectively, of the elongated, rectangular-shaped array. Upper group 17 comprises lamps 11-15, and lower group 18 includes lamps 21-25; the reflector cavities 11', etc. are disposed behind the respective lamp so that as each lamp is flashed, light is projected forwardly of the array. The lamps are arranged and connected so that when the array is connected to a camera by the connector tab 16 only the upper group 17 of lamps will be flashed, and when the array is turned end for end and connected to the camera by the other connector tab 16', only then the upper group 18 of lamps will be flashed. By this arrangement, only lamps relatively far from the camera lens axis are flashable, thus reducing the undesirable, "red-eye" effect.

As mentioned above, the planar array of ten tubular photoflash lamps 11-15 and 21-25 are arranged in two parallel columns with the lamps horizontally disposed and the lamps of one column staggered relative to the lamps of the other column. Each of the lamps has a base defined by a pinch seal ($11c$-$15c$ and $21c$-$25c$) from which the lead-in wires $11a$ and $11b$, etc., emerge and are connected to the printed circuitry on board 43 by eyelets, as discussed hereinafter. The column of lamps 15, 13, 11, 22, and 24 are positioned with their respective bases interdigitated with the bases of the adjacent column comprising lamps 14, 12, 21, 23, and 25. In this manner, the bases of one column of lamps face the adjacent column of lamps.

As best illustrated in FIGS. 1 and 2, the reflector system comprises a pair of adjacent strip-like reflector panels 40 and 41, each associated with a respective one of the columns of lamps, and each having a column of side-by-side lamp-receiving cavities on its front side formed with reflecting surfaces defining individual lamp reflectors which respectively are aligned behind the lamps associated therewith. More specifically, reflector panel 40 contains the cavities 14', 12', 21', 23', and 25', which are respectively aligned behind the column of lamps 14, 12, 21, 23 and 25. The reflector panel 41 contains cavities 15', 13', 11', 22' and 24', which are respectively aligned behind the column of lamps 15, 13, 11, 22, and 24. The individual reflector cavities of one panel are staggered relative to the individual reflector cavities of the other panel, and each reflector panel is foreshortened with respect to the lamps associated therewith, as particularly illustrated by panel 41 with respect to its associated column of lamps in FIG. 2. More particularly, in this embodiment the reflector cavities each have a substantially circular aperture 19, and the foreshortening of the reflector panel results in a segment of this aperture being removed along the edge of the panel facing the adjacent reflector panel such that the width of the reflector panel is less than the diameter of aperture 19. In this manner, as shown in FIG. 2, the base portions of the lamps, such as $15c$, tend to project beyond the edge of the associated reflector panel. Accordingly, when adjacent reflector panel 40 is assembled in abutment with panel 41, panel 40 covers the lead-in wires and substantial portions of the bases of the lamps associated with panel 41. Hence, with respect to all lamps of the array, the non-light-emitting portions of the lamps are covered by reflector panel surfaces. More specifically, the lead-in wires and base portions of all lamps associated with panel 41 underlie the adjacent panel 40 to be hidden thereby, and the lead-in wires and bases of the lamps associated with panel 40 underlie adjacent panel 41 to be hidden thereby.

In order to assure yet additional maximization of light output, the reflector panels, as illustrated, may also have a plurality of cut-outs 20 located along the edge thereof facing the adjacent panel and respectively aligned with the individual reflector cavities of that adjacent panel for exposing light-emitting portions of the lamps adjacent to the covered bases thereof. More specifically, the cut-outs 20 along the edge of each panel comprise arcuate recesses between the circular apertures 19.

The above-described arrangement of staggered-interdigitation of the lamp-reflector array has the effect of compacting the width of the unit. In addition, however, this configuration results in the lamps of one column being shifted in somewhat closer proximity to the camera than the lamps of the other column. According to one aspect of the present invention, I take advantage of this interrelationship by positioning the lowest lamp of the active group at a farther distance from the camera lens axis so as to further reduce the "red-eye" effect.

More specifically, referring to FIG. 1, the photoflash unit 10 is illustrated as mounted on and connected to a camera 60 (shown in phantom) by means of connector tab 16. The camera has a view finder 62 and a lens 64, both of which are also shown in phantom. Line a-a denotes the position of the lens axis, and line b-b denotes the vertical center-line of photoflash unit 10. As viewed in FIG. 1, the column of lamps 14, 12, 21, 23, and 25 and the camera lens axis a-a are located on the left side of the vertical centerline b-b of unit 10, while the column of lamps 15, 13, 11, 22 and 24 are located on the right side of vertical centerline b-b. Group 17 is the active group of lamps since connector 16 is attached to the camera 16. Hence, the camera is operatively coupled to lamps 11, 12, 13, 14 and 15. In providing two staggered columns of these lamps, the lamps 11, 13 and 15 could be positioned to the left of centerline b-b and lamps 12 and 14 could be positioned to the right side of the centerline, lamp 11 being the lowest of one column and lamps 12 being the lowest of the other column. Due to staggering, lamp 11 is disposed below lamp 12. In accordance with an aspect of the present invention, however, the columns are positioned with the lowest lamp of the active group, viz., lamp 11, located on the side of centerline b-b opposite the side on which the lens axis a-a is located when unit 10 is connected to a camera. Accordingly, as illustrated, lamps 11, 13 and 15 are positioned on the right side of centerline b—b, thereby placing lamp 11 at a farther removed position from the camera lens.

As illustrated, the inactive lamp group 18 is also positioned in two columns on the lower half of the array. In this instance, lamps 22 and 24 are on the right side of centerline b—b and lamps 21, 23 and 25 are on the left side of the centerline, the two groups being disposed together in a planar array of two parallel columns of respectively staggered lamps. Accordingly, when the array is turned end for end and connected to camera 60 by connector tab 16', the column of lamps 25, 23, 21 will be on the right of the centerline, thereby placing the then lowest lamp 21 of group 18 on the side of centerline b—b opposite that on which the lens is located.

The construction of the array further comprises front and back housing members 36 and 37, (see FIGS. 1 and 3) which preferably are made of plastic and are provided with interlocking members 38 which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 16 and 16', respectively, and also function to facilitate mechanical attachment to the camera socket. Sandwiched between the front and back housing members 36 and 37, in the order named, are the flashlamps 11, etc., the pair of adjacent strip-like reflector panels 40 and 41 (preferably each being an aluminum-coated plastic molding) shaped to provide the individual reflector cavities 11' etc., a transparent electrically insulating sheet (not shown), a printed circuit board 43 (visible in FIG. 2) provided with integral connector tabs 16 and 16', and a flash indicator assembly comprising a sheet of heat shrinkable material 28 (only partially visible in FIG. 3 as will be discussed) and an indicia sheet 44 (shown in FIG. 3) which may be provided with information and trademarks, and other indicia such as flash indicators 47 located behind the respective lamps and which change color due to heat and/or light radiation from a flashing lamp, thus indicating at a glance which of the lamps have been flashed and not flashed.

The indicia sheet 44 may be of paper or thin cardboard and provided with openings where the flash indicators 47 are desired. The flash indicator material 28 may comprise a sheet of heat-sensitive plastic material, for example, biaxially oriented polypropylene, which is laminated on the side of sheet 44 which faces the lamps and is visible in FIG. 3 only through the openings 47. The heat sensitive plastic 28 shrinks or melts when subjected to heat or radiant energy from an adjacent flashing lamp, thus effectively changing the color of the openings 47 in the indicia sheet 41. For example, the plastic material can be colored blue on its back side by ink or other suitable means; hence, each indicator 47 appears as a blue dot on the indicia sheet. The blue dot disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 28 may be arranged over all of the flash indicator openings.

Referring to FIG. 2, window means, such as openings 51, are provided in each of the reflector cavities 11', etc., behind the lamp aligned therewith. The circuit board 43 is provided with corresponding openings (not shown) to facilitate radiation from the flashlamps reaching the flash indicators 47. The rear housing member 37 is transparent (either of clear material or provided with window openings) to permit viewing of the indicia on the indicia sheet. The front housing member 36 is transparent, at least in front of the lamps 11, etc., to permit light from the flashing lamps to emerge forwardly of the array and may be tinted to alter the color of the light from the flashlamps.

In the specific embodiment illustrated, the reflector surface of each cavity basically comprises a paraboloid of revolution with a skirt 46 at the foreshortened end (see FIG. 2) and a dome dimple 47 at the other end of the reflector for accommodating the tipped off end of the lamp. The illustrated reflector panels 40 and 41 also are provided with conductive projections 92 which are disposed on the front face of each panel between the circular apertures and adjacent the arcuate recesses 20. The projections 92 fit through openings 94 in the front face of housing member 36. As each reflector panel has a conductive metallic coating over its entire front surface which may be connected, such as by a wire (not shown), to the ground circuit terminals 31 and 31', the projections 92 provide static grounding protection for the unit by assuring electrical contact with any charged object, such as a user's hand, which may touch the front of the array housing. A basic arrangement of this type is described in copending application Ser. No. 724,792, filed Sept. 20, 1976 and assigned to the present assignee.

The height and width of the rectangular array are substantially greater than its thickness, and the height and width of the reflector panels 40, 41, insulating sheet, and circuit board 43 are substantially the same as the interior height and width of the housing member 36 to facilitate holding the parts in place.

The tab 16, which is integral with the circuit board 43, is provided with a pair of electrical terminals 31 and 32, and similarly the tab 16' is provided with a pair of terminals 31' and 32', for contacting terminals of a camera socket for applying firing voltage pulses to the array. The terminals 31 and 31', which are connected in common to all lamps, are shown as having a J-shaped configuration for temporarily shorting the socket terminals while the array is being plugged in, to discharge any residual voltage charge in the firing pulse source and also to reduce the the likelihood of lamps being accidentally flashed by electrostatic voltage when the array is handled.

Referring to FIG. 3, the circuit board 43 has a "printed circuit" thereon for causing sequential flashing of the lamps by firing voltage pulses applied to the terminals 31, 32, or 31', 32'. The printed circuit may be functionally similar to that described in the aforementioned U.S. Pat. Nos. 3,894,226 or 4,017,728 except for extending the circuitry to accommodate an additional lamp in each half of the printed circuit board. The top and bottom halves of the printed circuitry preferably are reverse mirror images of each other. The lead wires 11a, 11b, etc., of the lamps 11 etc., may be attached to the circuit board 43 in various ways such as by means of metal eyelets 11a', 11b', etc., placed through openings in the board. The lead wires 11a, 11b, etc., underlie the reflector panels and pass through suitable openings (not shown) in the insulating sheet and into or through the respective pairs of eyelets 11a', 11b', etc. The ends of the eyelets are crimped or bent to hold the lead wires and make electrical contact thereto and also to hold the eyelets in place with their heads in electrical contact with the circuit of the circuit board.

As further described in U.S. Pat. Nos. 3,894,226 and 4,017,728, the circuitry on circuit board 43 includes radiation switches which are in contact with and bridge across circuit runs that are connected to them. The material for the radiation switches may be suitable material initially having an open circuit or high resistance, the resistance thereof becoming zero or of a low value when the material receives radiation in the form of heat and/or light from a respective adjacent lamp upon the lamp being flashed. For this purpose, each of the radiation switches is respectively positioned behind and near to a flashlamp 11, 12, 13, 14. Window means in the form of transparent sections or the illustrated openings 51 are provided in the reflector cavities in front of the switches to facilitate radiation transfer. Accordingly, as illustrated, the openings 51 are somewhat elongated to accommodate radiation transfer for both the indicators and switches. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the circuit on the upper part of the circuit board. The circuit runs from the plugged-in terminals at the lower part of the circuit board and extends upwardly so as to activate the circuitry in the upper half of the circuit board. Similarly, when the unit is turned around and tab 16' is plugged into a socket, the circuit board terminals will be connected to and activate the lamps which will then be in the upper half of the circuit board, and hence in the upper half of the flash unit. This accomplishes, as has been stated, the desirable characteristic whereby only the group of lamps relatively farthest away from the camera lens axis will be flashed, thereby reducing the undesirable "red-eye" effect.

According to another aspect of the invention, the aforementioned switching circuitry is connected to provide an order of lamp flashing which proceeds alternately between the two columns of lamps from the lowest lamp of an active group to the highest lamp of the array. Accordingly, the lamp of the active array which is closest to the camera yet removed from the lens axis a—a (e.g. lamp 11 of group 17), is also the first lamp to be flashed. Further, as will be described hereinafter, the flash indicating pattern will proceed in a clearly interpretable zig-zag fashion toward the top of the unit.

Figure 4:
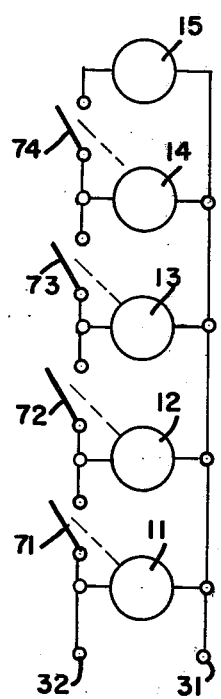
FIG. 4 is a circuit diagram of the top half of the photoflash unit of FIG. 1.

A circuit according to one embodiment of the invention, with respect to lamp group 17, is shown in FIG. 4. Such an array functions as follows. Assuming that none of the five lamps in the upper half of the unit have been flashed, upon occurrence of the first firing pulse applied across the terminals 31 and 32, this pulse will be directly applied to the lead-in wires of the first connected flashlamp 11, whereupon the lamp 11 flashes and becomes an open circuit between its lead-in wires. Heat and/or light radiation from the flashing first lamp 11 (the lowest lamp of group 17) causes the adjacent first radiation switch 71 to become a closed circuit (or a low value of resistance), thereby connecting the circuit board terminal electrically to a lead-in wire of the second lamp 12. By the time this occurs, the firing pulse has diminished to a value insufficient to cause the second lamp 12 to flash. When the next firing pulse occurs, it is applied to the lead-in wires of the second lamp 12 via the now closed radiation switch 71, whereupon the second lamp 12 flashes, thereby causing an adjacent second radiation switch 72 to assume zero or low resistance, and the second lamp 12 now has an open circuit or high resistance between its lead-in wires. When the next firing pulse occurs, it is applied via the now closed second radiation switch 72 to the third lamp 13, thereby firing the lamp which becomes an open circuit, and the radiation from it causes an adjacent third radiation switch 73 to become essentially a closed circuit across its terminals. Thus, the next firing pulse will be applied via the now closed third-radiation switch 73 to the lead-in wires of the fourth flash lamp 14, thereupon causing that lamp to flash. The fourth lamp then becomes an open circuit, and the radiation from it causes an adjacent fourth radiation switch 74 to become essentially a closed circuit across its terminals. The next (fifth) firing pulse will be applied via the now closed fourth radiation switch 74 to the lead-in wires of the fifth flashlamp 15, thereupon causing the last and highest lamp of the group 17 to flash. When the flash unit is turned around and the other connector tab 16' attached to the camera socket, the group 18 of lamps that then becomes uppermost and relatively farthest away from the lens axis will be in the active circuit and will be flashed in the same manner as has been described. In a preferred embodiment, the lamps 11, etc., are high voltage types requiring about 2,000 volts, for example, at low current for flashing, and they can be fired by impacting or stressing a piezoelectric element in the camera.

In order to assist the user of the flash unit in knowing which lamps have been flashed, the back of the flash unit (FIG. 3), which faces the user in normal operation, has an indicia sheet including numbered flash indicators 47, as mentioned hereinbefore. Accordingly, when the first lamp 11 of the sequence for group 17 flashes, the flash indicator 47 opening above the numeral "1" on the indicia sheet changes from a given color, say blue, to a void, or dark-appearing, space. This results from the heat shrinkable material 28 melting and shrinking back away from the center of the indicia sheet opening in response to radiation emitted from the flashed lamp 11 and transmitted via the corresponding reflector and circuit board openings (the reflector opening is denoted as 51 in FIG. 2). Hence, the number "1" blue-appearing dot changes appearance in response to radiation transmitted from flashed lamp 11. In like manner, upon the flashing of the second lamp 12, the blue dot of the indicator opening 47 above the numeral "2" on the indicia sheet is caused to shrink away. When the third lamp in the sequence, lamp 13, is flashed, the blue-colored plastic film covering the opening above the numeral "3" on the indicia sheet is caused to shrink away. Likewise, flashing of the fourth lamp 14 causes the blue dot above the numeral "4" on the indicia sheet to disappear, and flashing of the fifth lamp 15 (the last lamp in the sequence) causes the blue dot above the numeral "5" on the indicia sheet to disappear. This last indicator number "5" is the highest flash indicator on the unit when connector tab 16 is attached to a camera, as illustrated.

Accordingly, when the two staggered columns of lamps are connected by switching circuitry according to the invention, the order of flashing proceeds alternately between the two columns from the lowest lamp to the highest lamp of the active array, or group. As a result, referring to FIG. 3, the order of flashed lamp indication proceeds in a zig-zag fashion, starting with the change in appearance of colored dot "1" (the lowest of the group) and progressing through dots "2", "3" and "4" to the change in appearance of the last and highest indicator dot "5". This provides the user with a clearly interpretable visual indication of the lamps remaining to be flashed which is readily determined by a glance at the back of the unit. There is no confusing pattern, such as proceeding up one column and down the other, or up one column and then up the other. The appearance of a single blue dot above the numeral "5" at the top end of the unit, and well separated from the lower group of dots, gives a clear indication for alerting the user that the last lamp of the sequence is the next to be flashed. Accordingly, the above described arrangement significantly contributes to avoiding a common problem experienced by flash array users, namely, attempting to take additional pictures with the camera, only to find that there is no flash because the user has neglected to remove the flash unit after the last lamp of the sequence, or group, has been expended and either turn the unit around or employ a new flash unit. This, of course, results in a waste of film and photographic subject opportunities due to underexposure.

In summary, the present invention locates lamps and circuitry so as to significantly reduce the possibility of both the last-flash problem (discussed in the preceeding paragraph) and the "red-eye" problem in a compact photoflash unit arranged to contain more lamps in a given volume.

Although the present invention has been described with respect to a specific embodiment, it will be appreciated that modifications and changes may be made by those skilled in the art without departing from the true spirit and scope of the invention. For example, the basic principles of the invention are also applicable to an array of vertically disposed lamps or to an array of lamps arranged in a pair of aligned, rather than staggered, columns with the lowest lamp of one column disposed below the lowest lamp of the other column, such as would occur if one column had an additional lamp.

What I claim is:

1. A multilamp photoflash unit of elongated shape including means at one end thereof for operatively connecting said unit to a camera having a lens axis offset to one side of the vertical centerline of said unit, two parallel columns of photoflash lamps disposed in a planar array, said two columns respectively being disposed on opposite sides of said centerline with the lowest lamp of one column being disposed below the lowest lamp of the other column, and means for operatively coupling said lamps to said connecting means, wherein the improvement comprises said two columns of lamps being positioned with the lowest lamp thereof located on the side of said centerline opposite the side on which said lens axis is located when said unit is connected to a camera by said connecting means.

2. The unit of claim 1 wherein the lamps of one of said columns are staggered relative to the lamps of the other of said columns.

3. The unit of claim 2 wherein said lamps have tubular envelopes and are horizontally disposed in said two column planar array.

4. The unit of claim 3 wherein the means for operatively coupling said lamps to said connecting means comprises circuit means for flashing said lamps in response to firing pulses applied to said connecting means, said tubular lamps have respective bases from which lead-in wires emerge and are connected to said circuit means, the bases of said two staggered columns of lamps are interdigitated and face the adjacent column, and further including a multiple reflector system comprising a pair of adjacent strip-like reflector panels each associated with a respective one of said columns of lamps and having a column of side-by-side lamp receiving cavities on its front side formed with reflecting surfaces defining individual lamp reflectors which respectively are aligned behind the lamps associated therewith, the individual reflector cavities of one panel being staggered relative to the individual reflector cavities of the other panel.

5. The unit of claim 2 wherein the means for operatively coupling said lamps to said connecting means comprises switching circuitry for sequentially flashing said lamps in response to firing pulses applied to said connecting means, said unit further includes a plurality of flash indicator means located on the back of said planar array and respectively aligned behind each of said lamps, each indicator means being actuated by its associated lamp, and said improvement further includes said switching circuitry being connected to provide an order of flashing of said lamps which proceeds alternately between said two columns from the lowest lamp to the highest lamp of said array.

6. The unit of claim 5 further including a multiple reflector system comprising a pair of adjacent strip-like reflector panels each associated with a respective one of said columns of lamps and having a column of side-by-side lamps receiving cavities on its front side formed with reflecting surfaces defining individual lamp reflectors which respectively are aligned behind the lamps associated therewith, the individual reflector cavities of one panel being staggered relative to the individual reflector cavities of the other panel, each of said reflector cavities being provided with a window means behind the lamp aligned therewith, and an indicia sheet disposed on the back of said planar array, said flash indicator means comprising colored dots contained on said indicia sheet and respectively associated with said lamps, said flash indicator dots being operative to change appearance in response to radiation being transmitted from said lamps through said window means in the reflector cavities.

7. The unit of claim 6 wherein said lamps have tubular envelopes and are horizontally disposed in a planar array, the means for operatively coupling said lamps to said connecting means comprises circuit means for flashing said lamps in response to firing pulses applied to said connecting means, said tubular lamps have respective bases from which lead-in wires emerge and are connected to said circuit means, and the bases of said two staggered columns of lamps are interdigitated and face the adjacent column.

8. A multilamp photoflash unit of elongated shape having first and second oppositely disposed ends, said unit being provided with first connector means at said first end thereof and second connector means at said second end thereof, each of said connector means being provided for operatively connecting its respective end of said unit to a camera having a lens axis offset to one side of the vertical centerline of said unit, a first group of photoflash a camera having a lens axis offset to one side of the vertical centerline of said unit, a first group of photoflash lamps positioned in two columns in a first section of said unit relatively nearer to said first end thereof, the lowest lamp of one column being disposed below the lowest lamp of the other column where said second connector means is connected to a camera, a second group of photoflash lamps positioned in two columns in a second section of said unit relatively nearer to said second end thereof, the lowest lamp of one column being disposed below the lowest lamp of the other column when said first connector means is connected to a camera, said first and second groups of lamps together being disposed in a planar array of two parallel columns respectively disposed on opposite sides of said centerline, first coupling means coupling said first connector means to said second group of lamps and enabling flashing of the latter in response to flash actuation signals applied to said first connector means, and second coupling means coupling said second connector means to said first group of lamps and enabling flashing of the latter in response to flash actuation signals applied to said second connector means, said first section of the unit functioning as a flash extender for said second group of lamps and said second section of the unit functioning as a flash extender for said first group of lamps, wherein the improvement comprises said two columns of lamps being positioned with the lowest lamp of said first group located on the side of said centerline opposite the side on which said lens axis is located when said second connector means is connected to a camera and with the lowest lamp of said second group located on the side of said centerline opposite the side on which said lens axis is located when said first connector means is connected to a camera.

9. The unit of claim 8 wherein the lamps of one of said columns of the first and second groups together are staggered relative to the lamps of the other of said columns of the first and second groups together.

* * * * *